April 20, 1965 N. N. LAREAU ETAL Re. 25,766

TWO-SPEED CAMERA FOR FLASH PHOTOGRAPHY

Original Filed Dec. 23, 1960 2 Sheets-Sheet 1

NORMAN N. LAREAU
RICHARD J. OLSON
INVENTORS

BY R. Frank Smith
Steve W. Strembar
ATTORNEYS

TWO-SPEED CAMERA FOR FLASH PHOTOGRAPHY

Original Filed Dec. 23, 1960 2 Sheets-Sheet 2

NORMAN N. LAREAU
RICHARD J. OLSON
INVENTORS

BY R. Frank Smith
Steve W. Glenbow
ATTORNEYS

United States Patent Office

Re. 25,766
Reissued Apr. 20, 1965

25,766
TWO-SPEED CAMERA FOR FLASH PHOTOGRAPHY

Norman N. Lareau and Richard J. Olson, Rochester, N.Y., assignors to Eastman Kodak Company, Rochester, N.Y., a corporation of New Jersey Original No. 3,051,066, dated Aug. 28, 1962, Ser. No. 78,020, Dec. 23, 1960. Application for reissue Dec. 11, 1962, Ser. No. 243,963
15 Claims. (Cl. 95—11.5)

Matter enclosed in heavy brackets [ ] appears in the original patent but forms no part of this reissue specification; matter printed in italics indicates the additions made by reissue.

This invention relates generally to cameras, and more specifically to an improved two-speed camera for daylight and flash photography.

It is broadly old in the camera art to have a hinged part of the camera actuate a switch in the flash circuit to break and/or complete the circuit as the hinged part is moved between operative and inoperative positions. A camera of this general type is disclosed in British Patent 752,772. One of the disadvantages of this camera is that the flash circuit is always closed when the camera is operated to make an exposure, and hence any flash lamp contained therein will flash upon operation of the camera. Furthermore, in cameras of this type, the operator must manually change the shutter speed depending upon whether a daylight or flash exposure is to be made.

In the improved camera construction according to this invention, the flash reflector is provided with a hinged flash reflector door which, when moved into a closed position, opens the flash circuit so that a flash bulb may be stored in the reflector while the operator is making daylight exposures without causing the bulb to flash. On the other hand, when the door is opened, the flash circuit is closed and the lamp will flash when the operator makes an exposure. Furthermore, the door in moving between its open and closed positions automatically changes the shutter speed for the type of exposure being made. For daylight exposures, a shutter speed of, say, 1/100 second is desired, and for flash exposures, a slower speed, which may approximate 1/40 second, is required. The higher speed minimizes the number of blurred pictures due to camera movement as the exposure is being made and the slower speed permits the use of flash photography without the need of complicated and expensive synchronizing mechanism which is necessary to accommodate a high shutter speed.

One of the primary objects of the present invention is to provide an improved camera having a flash reflector door operable, upon movement between operative and inoperative positions, to automatically close and open a switch in the flash circuit.

Another object of this invention is to provide an improved camera having means movable between operative and inoperative positions for automatically changing the shutter speed as the camera is adjusted for flash or non flash operation.

A further object of this invention is to provide an improved camera in which the shutter speed is automatically changed between two values, simultaneously with the opening and closing of a switch in the flash circuit.

Another object of this invention is to provide an improved camera having a door adapted to protect the flash reflector and any flash lamp mounted therein while daylight exposures are being made.

Still another object of this invention is to provide an improved camera in which a flash bulb may be stored in the reflector with the reflector door closed without firing the bulb while taking daylight exposures.

A still further object of the invention is the provision of an improved camera in which the insertion of a flash bulb into the reflector unit automatically changes the shutter speed.

Another object of this invention is to provide an improved camera of simple design and construction, thoroughly reliable and efficient in operation, and economical to manufacture.

The above and other objects and advantages will be apparent from the following description when read in connection with the accompanying drawings, in which.

Figure 5:
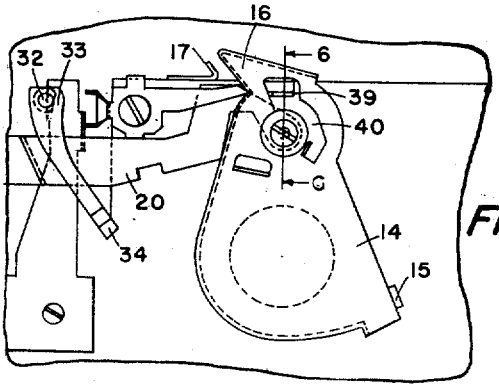
FIG. 5 is an enlarged segmental view of a portion of the structure shown in FIG. 4.

As shown in the drawings, this invention is embodied in a box-type camera 13 having a pivotal shutter blade 14 biased by a spring, not shown, into engagement with a stop 15. The shutter blade 14 has an arm 16 at one end adapted to be struck by a lever 17 as seen in FIG. 5 which imparts a clockwise swinging movement to shutter blade 14 against the bias of a spring, not shown, to make an exposure of a predetermined duration. The mechanism for striking shutter blade 14 may be of any known type, and since it does not form a part of the invention, it has not been shown or described in detail. In a pivotal, single blade shutter of this type, by properly designing striking lever 17 so that it will impart a striking force of a predetermined value, and properly designing the weight of blade 14 and the force of the shutter spring, it is possible to obtain a relative long exposure (slow shutter speed) of, say, 1/40 second duration when the blade is permitted to travel freely without imposing any stop member in its path. If, on the other hand, a stop member is interposed in the path of shutter blade 14 preventing the blade from completing its full travel, a relatively short exposure (faster shutter speed) is achieved. By properly positioning the stop member, it is possible to achieve a shutter speed of, say, 1/100 second duration. As indicated earlier, the shutter speed of 1/100 second duration minimizes the number of blurred pictures due to camera movement as the exposure is being made, and the shutter speed of 1/40 second permits the use of flash photography without the need of a complicated and expenive synchronizing mechanism. These speeds are of course given merely by way of illustration.

Figure 1:
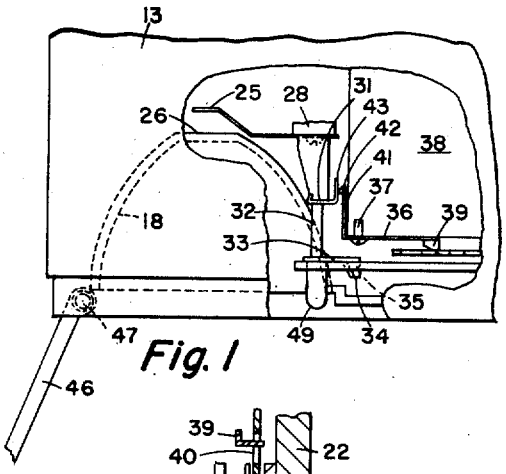
FIG. 1 is a segmental top plan view of a preferred embodiment of this invention in a camera showing the reflector door in an open position, and a switch in the flash circuit in a closed position.
Figure 2:
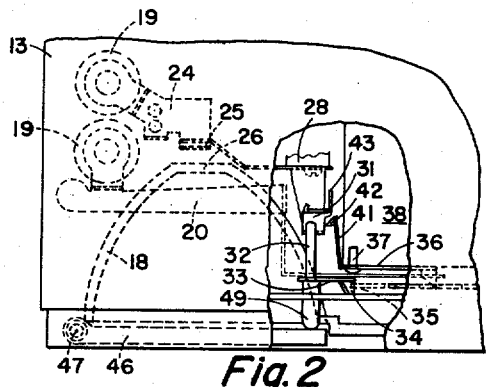
FIG. 2 is a view similar to FIG. 1 showing the reflector door in a closed position, and the switch in the flash circuit in an open position.
Figure 6:
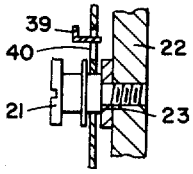
FIG. 6 is a segmental section view taken along line 6—6 of FIG. 5.
Figure 7:
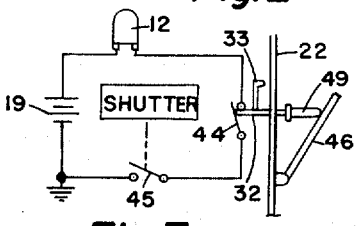
FIG. 7 is a view showing the electrical wiring diagram of the flash circuit of the camera with the portions thereof shown diagrammatically.
Figure 3:
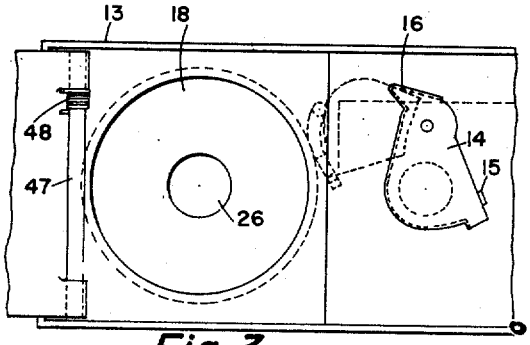
FIG. 3 is a segmental front elevation view of the camera of FIG. 1.
Figure 4:
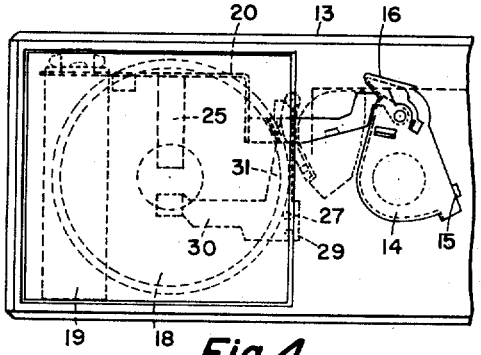
FIG. 4 is a segmental front elevation view of the camera of FIG. 2.

The box camera 13 has a flash reflector 18 of any suitable type built into the body thereof, and a pair of batteries 19 seen dotted in FIGS. 2 and 4 connected in series in the normal manner is mounted in camera 13 to the rear of flash reflector 18. A contact arm 20 of irregular shape as seen best in FIGS. 2, 4 and 5 has one end connected to an electrode of one of the batteries 19, and its opposite end mounted on a post 21 about which shutter blade 14 pivots and interposed between the plastic camera wall 22 and a shoulder 23 formed by post 21 as seen in FIG. 6. Another contact arm 24 as seen in FIG. 2 has one end connected to an electrode of the other battery 19, and has a depending arm 25 at its other end extending behind a socket 26 of flash reflector 18 for engagement with one of the electrodes of a flash lamp 12, shown diagrammatically in FIG. 7, upon insertion of lamp 12 into socket 26. Another contact arm 27 of irregular shape as seen in FIGS. 2 and 4 is secured intermediate its ends to a plastic shoulder 28 of camera 13 by means of tap screws 29 or the like. One end 30 of arm 27 extends behind the flash reflector socket 26 for engagement with the other electrode of flash lamp 12, and the opposite spring blade end 31 is biased into engagement with one end of a plunger 32 reciprocally carried by front wall 22 of camera 13 as seen best in FIGS. 1 and 2. The plunger 32 has an arm 33 secured thereto as seen best in FIG. 5 having a lip 34 at its free end movable into a slot 35 formed by front wall 22 of camera 13. When lip 34 is seated in slot 35, as seen in FIG. 1, it is out of the path of shutter blade 14, but when it extends out of slot 35, as seen in FIG. 2, lip 34 provides a stop member for shutter blade 14 for achieving a shutter speed of 1/100 second duration. Another contact arm 36 as seen best in FIGS. 1 and 2 is secured by a screw 37 to a plastic housing 38 of camera 13, and has a beveled end 39 thereof extending into an opening 40 in the upper portion of shutter blade 14 and out of contact therewith. The shutter blade 14 and end 39 form a switch 45, shown diagrammatically in FIG. 7, and upon operation of camera 13 to make an exposure, shutter blade 14 as it swings in its travel engages the beveled end 39 of contact arm 36 closing switch 45. The contact arm 36 further has a flexible portion 41 whose beveled end 42 extends into the path of a lug 43 formed by the end of contact arm 31, the portion 41 and lug 43 forming a switch 44, shown diagrammatically in FIG. 7, in the flash circuit of camera 13. The camera 13 further has a door 46 having one edge thereof pivotally [illegible] mounted on a shaft 47. A torsion spring 48 encircles shaft 47 and is mounted to urge the camera door into its open position, as seen in FIG. 1. The camera 13 is further provided with a latch mechanism, not shown, for releasably holding door 46 in a closed position. One end of plunger 32 extends completely through front wall 22 of camera 13 to form a button 49 which is adapted to be engaged and depressed by door 46 as it is moved into its closed position, as seen in FIG. 2.

In the operation of this invention, when flash reflector door 46 is closed, as seen in FIG. 2, plunger 32 is depressed, urging lug 43 out of engagement with blade end 42 thereby opening switch 44 in the flash lamp circuit, and further interposing lip 34 in the path of shutter blade 14. Consequently, as long as flash reflector door 46 is closed, all of the exposures will be of 1/100 second duration, and the flash circuit will be broken so that a flash lamp may be positioned in socket 26 of flash reflector 18 without any risk of actuating or firing it so long as the door is in closed position. Should the operator desire to take a flash picture, he merely releases flash reflector door 46 which is urged by its spring 48 into the open position, as seen in FIG. 1. The spring blade end 31 then urges plunger 32 outwardly, urging lip 34 into slot 35 and out of the path of shutter blade 14, and further moves lug 43 into engagement with blade end 42 closing switch 44 of the flash circuit. In this position, upon operation of camera 13 shutter blade 14 will complete its full travel to achieve an exposure of 1/40 second duration, and as soon as shutter blade 14 engages the end 39 of contact arm 36, thereby closing switch 45 the flash circuit including flash lamp 12 is completed.

Figure 8:
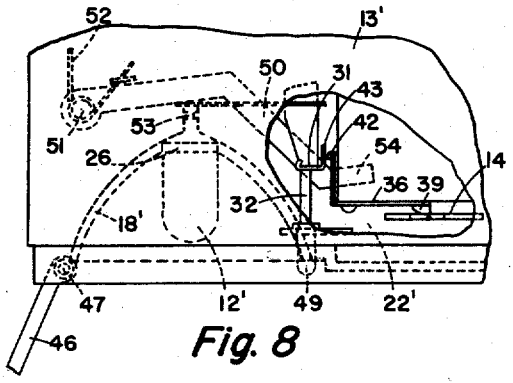
FIG. 8 is a view similar to FIG. 1 showing another modification of the invention in which the shutter speed is responsive to the insertion or removal of a flash bulb.
Figure 9:
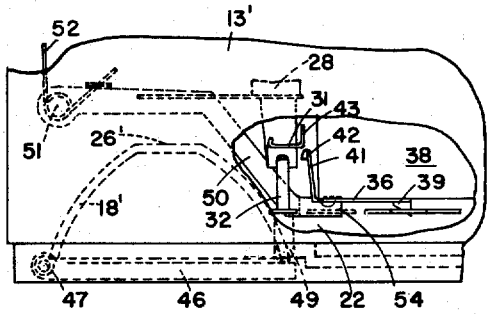
FIG. 9 is a view similar to FIG. 8 showing the camera with the flash bulb removed therefrom.
Figure 10:
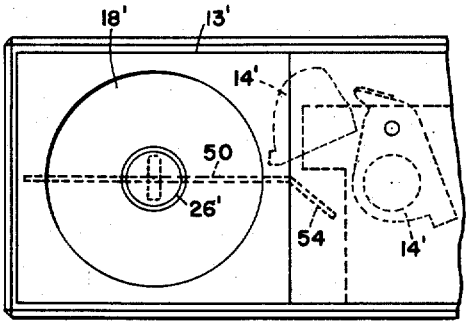
FIG. 10 is a front elevation view of the camera of FIG. 8.
Figure 11:
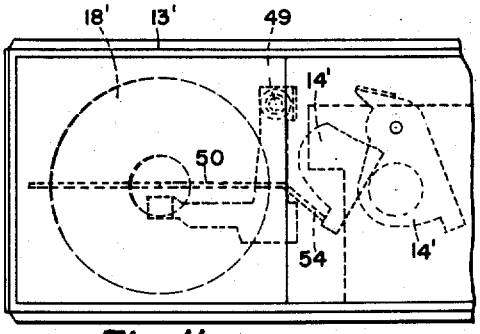
FIG. 11 is a front elevation view of the camera of FIG. 9.
Figure 12:
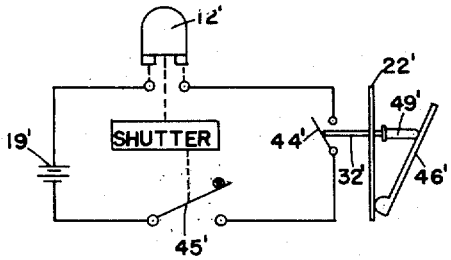
FIG. 12 is a view showing the electrical wiring diagram of the flash circuit of the camera shown in FIGS. 8–11 with portions thereof shown diagrammatically.

In the modification of the invention shown in FIGS. 8–10, parts similar or identical to previously described parts will be indicated by the same number primed. In this modification, the arm 33 and lip 34 have been eliminated, and the change in shutter speed is achieved by insertion of a flash lamp 12' into socket 26' of flash reflector 18'. A lever 50 has one end thereof pivotally mounted on a stud 51 of camera 13', and is urged by a spring 52 in a clockwise direction. When flash reflector door 46' is opened and flash lamp 12' is inserted into socket 26' of flash reflector 18', as seen in FIG. 8, a portion 53 thereof engages lever 50 and urges it in a counterclockwise direction against the bias of its spring 52 withdrawing its free end 54 out of the path of shutter blade 14'. Consequently, when the camera 13' is operated to make a flash exposure, shutter blade 14' will complete its full travel achieving an exposure of 1/40 second duration. When flash lamp 12' is removed from reflector socket 26', spring 52 urges lever 50 in a clockwise direction moving its free end 54 into engagement with front wall 22' of camera 13'. In this position, free end 54 is interposed in the path of shutter blade 14' and forms a stop therefor as seen in FIGS. 9 and 11, and is properly positioned to achieve an exposure of 1/100 second duration.

The invention has been described in detail with particular reference to preferred embodiments thereof, but it will be understood that variations and modifications can be effected within the spirit and scope of the invention, as described hereinabove and as defined in the appended claims.

We claim:

1. In a flash camera, the combination comprising:
   (a) a shutter mechanism including a part which moves when the shutter operates to make an exposure *and the extent of movement of which part determines the exposure speed of said shutter mechanism;*
   (b) flash means for said camera movable between an operative position for illuminating the subject upon making an exposure, and an inoperative position for preventing illumination of the subject upon making an exposure;
   (c) control means movable between two positions into and out of engagement with said movable part of said shutter mechanism to achieve shutter speeds of two different durations; and
   (d) means interconnecting said control and flash means for moving said control means into one of said two positions in response to movement of said flash means from one of its positions to the other.

2. The invention according to claim 1 wherein said movable part of said shutter mechanism comprises a pivotal shutter blade, and said control means comprises a stop member adapted to be inserted into the path of said shutter blade in one of said two positions.

3. The invention according to claim 1 wherein said flash means comprises a flash reflector unit for receiving a flash lamp, and a flash reflector door movable between an open position exposing said flash reflector and a closed position covering said reflector, and said control means is movable to one of said two positions by said door upon movement of said door to its closed position.

4. The invention according to claim 3 wherein said movable part of said shutter mechanism comprises a pivotal shutter blade, and said control means comprises a reciprocally movable element having a stop member adapted to be inserted in the path of said shutter blade in one of said two positions.

5. The invention according to claim 1 wherein said flash means comprises a flash reflector unit for receiving a flash lamp insertable therein, and said control means is movable to one of said two positions by said flash lamp upon insertion thereof in said flash reflector unit.

6. The invention according to claim 5 wherein said movable part of said shutter mechanism comprises a pivotal shutter blade, and said control means comprises a pivotal lever having a stop member adapted to be inserted in the path of said shutter blade in one of said two positions.

7. In a camera having a shutter mechanism, a flash reflector unit, and a flash circuit including a switch associated therewith for firing a flash lamp inserted in said reflector unit, the combination comprising: a flash reflector door movable between an open position exposing said flash reflector and a closed position covering said reflector; actuating means movable between a normal first position in which said flash circuit switch is closed to facilitate firing a flash lamp for taking flash exposures, and a second position in which said switch is opened and said circuit disabled; means interconnecting said actuating means with said shutter to provide a longer exposure when said actuating means is in said first position than when in said second position; and means interconnecting said door and said actuating means to insure that said actuating means is in said first position when said door is in its open position.

8. The invention according to claim 7 wherein said shutter mechanism comprises a pivotal shutter blade, said actuating means comprises a reciprocally movable element, and said interconnecting means comprises a stop member adapted to be inserted in the path of said shutter blade in said second position.

9. In a flash camera, the combination comprising: a shutter mechanism; flash means for said camera including connecting means movable between a normal operative position for illuminating the subject upon making an exposure, and an inoperative position for preventing illumination of the subject upon making an exposure; a stop member movable between a first position in which it is free of said shutter mechanism to achieve a slow exposure, and a second position in which it restricts said shutter mechanism to achieve a faster exposure; and means for simultaneously moving said stop member between said first and second positions and said connecting means between its operative and inoperative positions respectively.

10. The invention according to claim 9 wherein said connecting means comprises a switch, and said moving means comprises a movable element connected to said switch and carrying said stop member, and a door movable between open and closed positions for controlling movement of said element.

11. In a flash camera, the combination comprising: a shutter mechanism; flash means for said camera including switch means movable between an operative position for illuminating the subject upon making an exposure, and an inoperative position for preventing illumination of the subject upon making an exposure, said flash means further including a flash reflector unit for receiving a flash lamp inserted therein for taking a flash exposure; means interconnecting said flash lamp to said shutter mechanism to provide a slower exposure when said flash lamp is inserted in said reflector unit than when it is not inserte therein; and means for moving said switch means into i operative position whereby upon the insertion of sa flash lamp in said reflector unit, a slower flash exposu is achieved upon making an exposure.

12. The invention according to claim 11 wherein sa shutter mechanism comprises a pivoted shutter blade, ar said interconnecting means comprises a pivotal lever ha ing a stop member adapted to be removed from the pa of said shutter blade upon insertion of said flash lamp i said reflector unit.

13. In a flash camera, the combinaton comprising: shutter mechanism; a flash reflector unit for receiving flash lamp inserted therein for taking a flash exposur and means interconnecting said flash lamp to said shutt mechanism to provide a slower exposure when said flas lamp is inserted in said reflector unit than when it is n inserted therein.

14. The invention according to claim 13 wherein sai shutter mechanism comprises a pivoted shutter blade, an said interconnecting means comprises a pivotal lever ha ing a stop member adapted to be removed from the pat of said shutter blade upon insertion of said flash lamp i said reflector unit.

*15. In a flash camera, the combination comprising:*

*(A) a shutter mechanism including a part which mov when the shutter operates to make an exposure an the extent of movement of which part determines th exposure speed of said shutter mechanism;*

*(B) flash means for said camera movable between a operative position for illuminating the subject upo making an exposure, and an inoperative position fo preventing illumination of the subject upon makin an exposure;*

*(C) control means movable between two position and engageable with said movable part in at leas one of said positions to limit the extent of movemen of the part and thereby achieve shutter speeds of di ferent durations in said respective positions; and*

*(D) means interconnecting said control and flas means for moving said control means into one o said two positions in response to movement of sai flash means from one of its positions to the other.*

References Cited by the Examiner

The following references, cited by the Examiner, are o record in the patented file of this patent or the origina patent.

UNITED STATES PATENTS

| | | | |
|---|---|---|---|
| 2,881,685 | 4/59 | Wagner | 95—11.5 |
| 2,967,469 | 1/61 | Lachaize | 95—11 |

References Cited by the Applicant

UNITED STATES PATENTS

| | | |
|---|---|---|
| 2,531,936 | 11/50 | Fairbank. |

NORTON ANSHER, *Primary Examiner.*

JOHN M. HORAN, *Examiner.*